E. WILSON.
Rendering Apparatus.
No. 167. Reissued May 7, 1850.
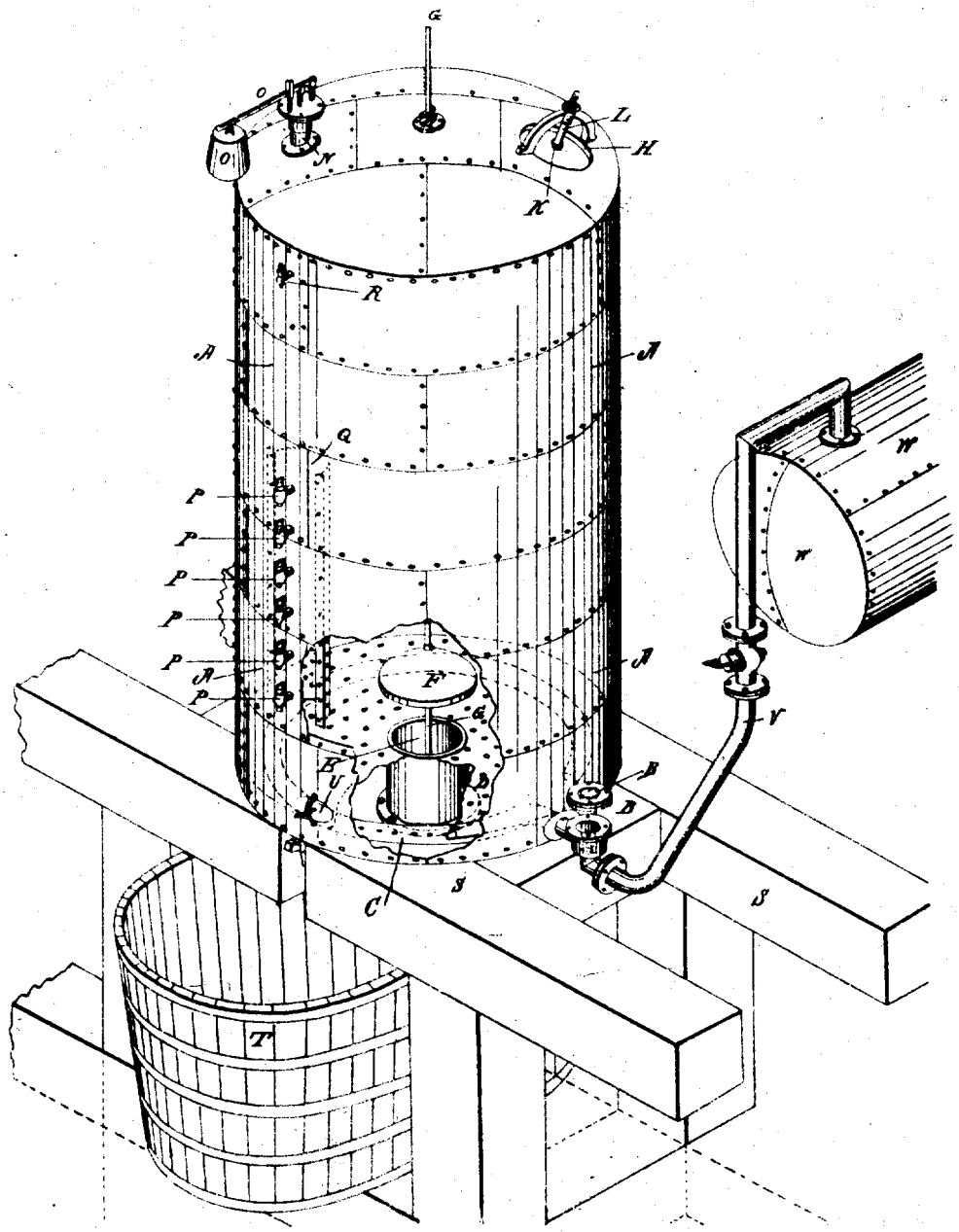

UNITED STATES PATENT OFFICE

EBENEZER WILSON, OF CINCINNATI, OHIO.

IMPROVEMENT IN MACHINES FOR RENDERING LARD AND TALLOW.

Specification forming part of Letters Patent No. 3,784, dated October 9, 1844; Reissue No. 167, dated May 7, 1850.

*To all whom it may concern:*

Be it known that I, EBENEZER WILSON, of Cincinnati, in the county of Hamilton and State of Ohio, have invented a new and useful Improvement in the apparatus for and process of extracting and rendering lard, tallow, and oil from concrete substances, and for refining and purifying the same; and I do hereby declare that the following is a full and exact description of the construction and operation of the said apparatus.

The nature of my invention in the apparatus for extracting and rendering lard, &c., by the action of steam under high pressure consists in combining with a steam-tight tank provided with a perforated steam-pipe for the admission of high-pressure steam, and with a large discharge-boiler and cover for the discharge of the residuum, a perforated false bottom above the perforated steam-pipe, which perforated false bottom is to sustain the charge under the pressure and weight, and thus admit of the equal distribution and passage of the steam through the charge, and also to admit of the free and equal passage of the water of condensation.

The nature of my invention also consists in combining with the said tank one or more try-cocks near the top and a regulating discharge-cock at or near the bottom for the purpose of discharging the water of condensation during the progress of the process, whenever by the use of the try-cock the attendant ascertains that the tank is too full of water of condensation, and thus by these means insuring the free passage of steam through the charge; and the nature of my invention also consists in combining with the said tank a series of discharge-cocks, arranged one above another, for the purpose of drawing off the rendered lard, &c., as it floats on the water of condensation, and the foreign substances, which by reason of their greater specific gravity will be found below.

The following is the description of the apparatus used by me, illustrated by the drawing hereunto annexed, which is on a scale of one inch to the foot.

My apparatus consists of a boiler, W, for generating steam, similar to those in common use for that purpose; A A A A, a close cylindrical vessel or tank made of boiler-iron and placed vertically; B B, a foot-valve and bonnet at the junction with the tank of V, which is a pipe connecting the boiler W with it; C, a pipe attached to the said foot-valve and bonnet, perforated with holes and coiled on the bottom of the tank aforesaid inside of said tank; D, a false bottom made of iron, perforated with holes, placed within the tank aforesaid, and elevated by supports about six inches from the bottom thereof; E, a discharging-hole, the upper end of which opens above the false bottom, and its lower end passes through the bottom of the tank aforesaid, usually at the center thereof; F, a cover to the discharging-hole aforesaid. This cover is ground so as to fit water-tight on the top of the opening E.

G G represent a bolt or rod which passes through the tank from the bottom to the top. The lower end of this rod has a screw cut on it to receive a nut for the purpose of fastening the cover F down in the same way in which the cover of the man-hole, K, is fastened. The rod G therefore serves as a bolt to secure the cover of the discharging-hole in its proper place. The upper part of this rod passes through a stuffing-box placed on the head or top of the tank, and any suitable power applied to it will serve to raise the cover F of the discharging-hole.

H is a man-hole through which the tank is charged; K, a man-plate to cover the man-hole aforesaid; L, a bolt for securing the man-plate aforesaid, passing through an arch-piece for securing the man-plate aforesaid; N, a safety pipe and valve; O O, a lever and weight for the safety-valve aforesaid.

P P P P P P are cocks on the side of the tank, placed one above the other. These may be ten inches apart, the one nearest to the bottom of the tank being about three feet therefrom. These cocks are used to draw the rendered or refined lard, tallow, or oil from the tank.

Q Q represent an iron strainer placed over the openings of the cocks aforesaid on the in.

side of the tank; R, a try-cock to determine the state of the contents of the tank during the process of rendering or refining, placed near the top of the tank; X, a regulating-cock to draw off a portion of the contents of the tank should it be found too full. During the process aforesaid this regulating-cock is placed in the bottom of the tank. T is a tub or vessel placed under the discharging-hole to receive the water and sedimentary contents of the tank when discharged therefrom; S, the timber-works supporting the tank; U, an opening or man-hole for giving admission to the upper side of the false bottom.

The following is the description of the operation as practically performed by me: I affix the false bottom in its place and close the discharge-hole, fill the tank through the man-hole nearly full, leaving about two and a half feet at the top unfilled, with the substance from which the lard, tallow, or oil is to be extracted, or with the lard, tallow, or oil to be refined and purified; then secure the man-plate K over the man-hole H; then introduce steam under a high pressure from the steam-boiler W, through the foot-valve, into the perforated pipe C within the tank, set the safety-valve at the pressure required, keep up the full pressure of steam—say of from fifty to a hundred pounds to the square inch—for the space of from eight to fifteen hours continuously, as may be required from the condition of the substance to be rendered or refined, and during the process of steaming, as aforesaid, carefully and frequently determine the state of the contents of the tank by opening the try-cock R. If the quantity of condensed steam in the tank is too great, it will be indicated by the ejection of lard, tallow, or oil from the try-cock aforesaid, and in such a case the regulating-cock X should immediately be opened and the condensed steam permitted to flow therefrom into the receiving-tub T until the lard, tallow, or oil shall cease to flow from the try-cock aforesaid. After the eight or fifteen continuous hours aforesaid have expired, discontinue the introduction of steam into the tank, and let the steam escape therefrom through the try-cock aforesaid and the safety-valve aforesaid; then allow the contents to settle, after which draw the lard, tallow, or oil through the cocks P P, &c., in the side of the tank into a cooler of the ordinary construction. After the tallow, lard, or oil is drawn off as above, raise the cover F from the discharging-hole E by the rod G, and discharge the remaining contents of the tank into the tub T, and if on inspection oleaginous matter is found in the tub return it to the tank and put it through the operation again the next time the tank is filled.

I am aware the steam has been admitted into a vessel containing the concrete materials from which lard, oil, or tallow is to be separated; that it has been allowed to pass under a perforated false bottom and through coiled tubes, also perforated, so as to cause the steam to come into direct contact with the materials to be rendered; but this process has been comparatively inefficient in consequence of the employment of open vessels to contain the fatty materials.

I have found by actual experiment that to produce the best result the steam-pressure within the vessel should not be less than fifty pounds to the square inch. The pressure usually employed by me has been about seventy-five pounds to the inch, and I intend to carry it up to a hundred pounds, as the higher the pressure the more rapid is the process. By this procedure the bones are reduced so as to lose their tenacity, and they are made to part with all the sebaceous matter contained in them. When lard is obtained from the whole carcass of the hog, with the exception only of the hams and shoulders, I have obtained a yield of full twelve per cent. greater in my apparatus than has been obtained in any other, and in rendering tallow about half that amount. The operation is performed in about one-third of the time ordinarily required and with one-third of the labor. The material obtained bears also a higher price in the market, being much more pure than when not obtained under a high pressure, all foreign matter being effectually separated from it, while in the ordinary process the gelatine remains in the rendered product, together with other impurities.

It will be obvious from the foregoing that instead of discharging the residuum through the hole E this may be done through the man-hole U; but it will be found more convenient to use the hole E for this purpose.

What I claim as my invention, and desire to secure by Letters Patent in the above-described apparatus for extracting or rendering lard, &c., by the action of high-pressure steam, is—

1. Combining with a steam-tight tank, substantially such as herein described, and provided with one or more discharge-holes for the discharge of the residuum, and with a perforated steam-pipe at bottom for the introduction of high-pressure steam, a perforated false bottom above the steam-pipe to sustain the charge under the weight and pressure, substantially as described, to admit of and insure the free passage of the steam through the charge, and also the free descent of the water of condensation, as described.

2. In combination with the tank, substantially such as herein described, the employment of one or more try-cocks near the top thereof, and a regulating discharge-cock at or near the bottom, substantially as herein described, for the purpose of ascertaining when too much water of condensation has accumulated, and to discharge the same, to retain a sufficient space above for steam to insure the passage of steam through the charge, as described.

3. In combination with a tank, substantially such as herein described, and for the purpose specified, the employment of a series of discharge-cocks arranged at different levels, substantially as described, for the purpose of drawing off the rendered lard, &c., as it floats on the water of condensation, and thus insure the separation of the pure lard, &c., from all foreign substances, when this is combined with the relief or discharge cock X, substantially as described.

EBENEZER WILSON.

Witnesses:

T. C. DONN,
FRAS B. LORD.